UNITED STATES PATENT OFFICE.

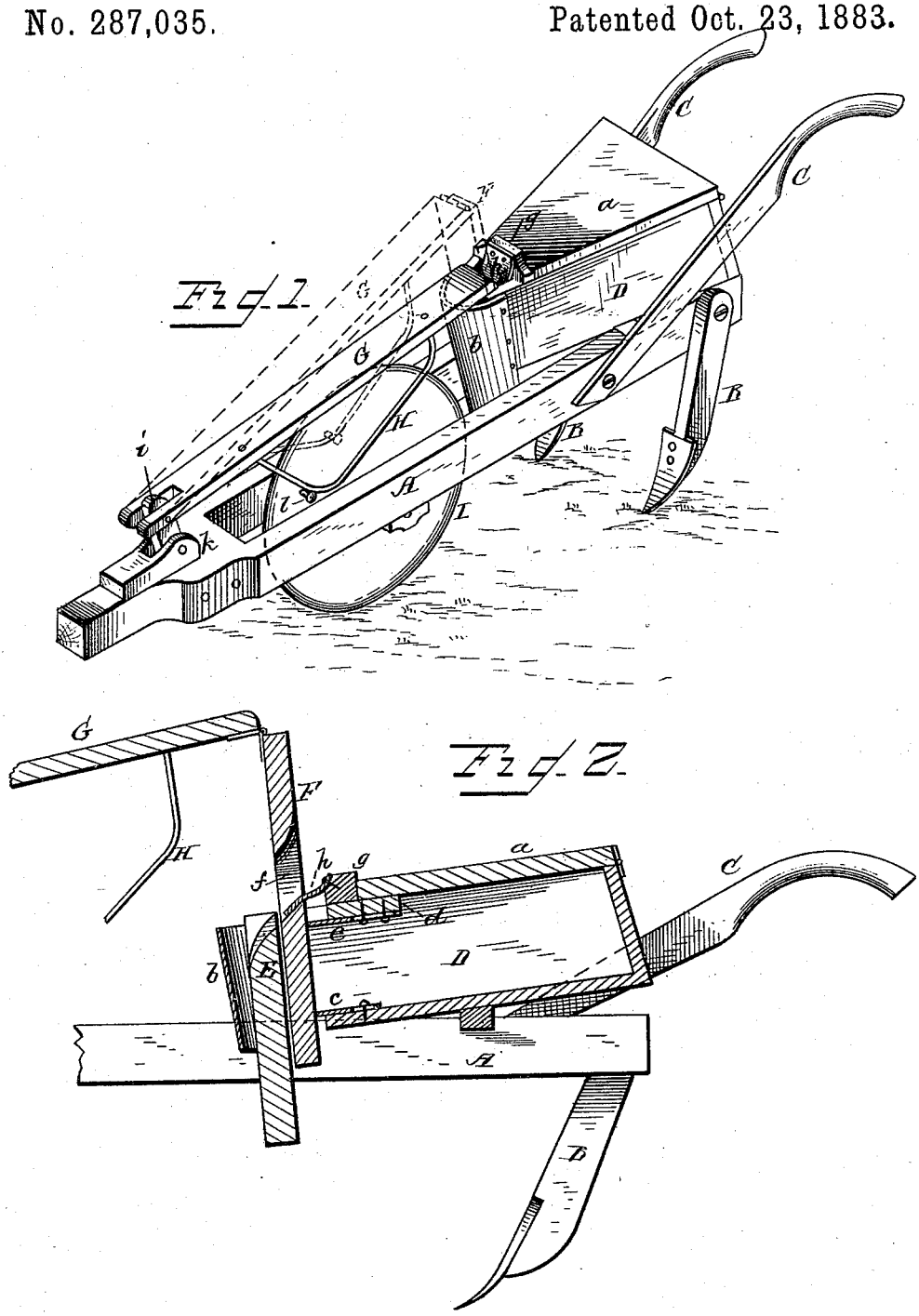

JOHN M. LINDSEY, OF CRYSTAL SPRINGS, GEORGIA.

SEEDING-MACHINE.

SPECIFICATION forming part of Letters Patent No. 287,035, dated October 23, 1883.

Application filed March 30, 1883. (No model.)

*To all whom it may concern:*

Be it known that I, JOHN M. LINDSEY, a citizen of the United States, residing at Crystal Springs, in the county of Floyd and State of Georgia, have invented certain new and useful Improvements in Seeding-Machines; and I do hereby declare that the following is a full, clear, and exact description of the same, reference being had to the annexed drawings, making a part of this specification, and to the letters and figures of reference marked thereon.

Figure 1 of the drawings is a perspective view of my invention, and Fig. 2 a sectional view in detail.

The present invention has relation to certain new and useful improvements in seeding-machines, and has for its object to provide such a machine as will be simple in construction, perfect in its operation, less liable to get out of order than those in common use, and in which the grain or seed is prevented from being wasted during the process of depositing it in the hill, the machine being regulated, when desired, to deposit the grain or seed any distance apart and in any quantity. These several objects I attain by the construction substantially as shown in the drawings, and hereinafter described and claimed.

In the accompanying drawings, A represents the frame of the machine, consisting of the usual beams of an ordinary plow-stock, provided with suitable plows, B, and handles C.

To the rear of the frame A is secured the seed-hopper D, which may be provided with a suitable cover, $a$, and at its front end a spout, $b$, for the discharge of the seed, said spout having located within it a chute, E, consisting of a rectangular block of wood grooved at its upper end, and extending some distance below the lower end of the spout, thus forming a guide for the seed after it passes out of the hopper, and directing it to the place of deposit with certainty and without its spreading, the grooved end of the block or chute E conducting the grain into the spout. The hopper D is open at its front end, and has secured to its bottom, upon its interior, a leather or other flexible valve, $c$, which projects beyond the bottom of the hopper, to prevent the seed from escaping over the edge thereof, and also admit of the slide F freely working between the chute E and hopper.

To the sides of the hopper D is secured a cross-piece, $d$, to the under side of which is connected a flexible scraper, $e$, of leather or other suitable material, which knocks off all the loose grain or seed adhering to the side of the slide F as the slide is raised, thus preventing the scattering or wasting of the seed. The slide F has an inclined and flaring opening, $f$, through it, which forms the bucket to take the seed from the hopper in its ascent and deliver it over the chute E into the spout.

The valve $c$, as will be noticed, is adjustable by forming therein an elongated slot, and holding it at any distance from the edge of the hopper D by a set-screw or other fastening device passing through the elongated slot and into the bottom of the hopper, as shown in Fig. 2, the object being to adapt the machine to various thicknesses of slides F when it is required to increase or diminish the amount of grain or seed taken up by the slide F, a slide varying in thickness being substituted. The scraper $e$ may also be rendered adjustable by the same means and for a similar purpose.

To the cross-piece $d$ is secured a block, $g$, or, if preferred, to the upper edges of the sides of the hopper, a flexible tongue, $h$, being connected to the block and entering the opening $f$. This tongue $h$ enters the opening $f$ of the slide F at each stroke of the slide, and is to prevent any grains of extreme length from lodging in the opening and going back into the hopper, the action of the tongue being to force the grain forward at the bottom of the opening over and upon the chute. The upper end of the slide F has hinged to it the inner end of a lever, G, the outer or opposite end of said lever being connected to the forward end of the frame A by a pivoted link, $i$, the lower end of the link being pivoted to suitable ears, $k$, on the frame, while the upper end thereof extends into the bifurcated end of the lever and is pivoted thereto, thereby forming a double hinge at the point of connection of the lever with the frame. This feature of my invention, as well as the others heretofore described, is considered of great value and advantage, as it allows the lever to operate with comparatively little trouble, and also admits of the rear end of the lever resting perfectly flat upon the upper portion of the hopper, thus allowing no grain to lodge behind the slide.

To the under side of the lever G is connected an angular arm, H, of wire, bent as shown in Fig. 1, which, in connection with the pins or pin *l*, projecting from the side of the wheel I, operates the lever, the pin as the wheel rotates coming in contact with the angular wire arm and raising the lever, one, two, or more pins being used, as found necessary, to deposit the grain nearer together or farther apart. The wire arm H is both convenient and simple, and there is less trouble in constructing it; also, it is not as liable to break or get out of order as the ordinary wooden arms.

Having now fully described my invention, what I claim as new, and desire to secure by Letters Patent, is—

1. The frame A, hopper D, and wheel I, having one or more pins, *l*, in combination with the lever G, carrying arm H, and hinged at one end to the slide F and at its opposite end to the frame of the machine by the pivoted link *i*, substantially as and for the purpose set forth.

2. The combination, with the wheel I, having one or more pins, *l*, and the hopper D, having spout *b* and chute E, of the slide F, provided with flaring and inclined opening *f*, and the lever G, carrying the wire arm H, and hinged to the slide and to the frame of the machine by the pivoted link *i*, substantially as and for the purpose described.

3. The lever G, connected to the frame A by pivoted link *i*, and to the slide F by suitable hinge, and carrying the arm H, in combination with the wheel I, pin or pins *l*, and the hopper D, having the spout *b*, chute E, and adjustable valve *c*, substantially as and for the purpose specified.

4. The hopper D, provided with spout *b*, chute E, and flexible valve *c*, scraper *e*, and the flexible tongue *h*, in combination with the lever G, connected to the frame A at its outer end by pivoted link *i*, and having hinged at its rear end slide F, formed with inclined opening *f*, said lever being operated by the drive-wheel of the machine, substantially as and for the purpose set forth.

In testimony that I claim the above I have hereunto subscribed my name in the presence of two witnesses.

JOHN MARION LINDSEY.

Witnesses:
W. J. RIGGAN,
G. A. NUNNALLY.